Patented June 4, 1946

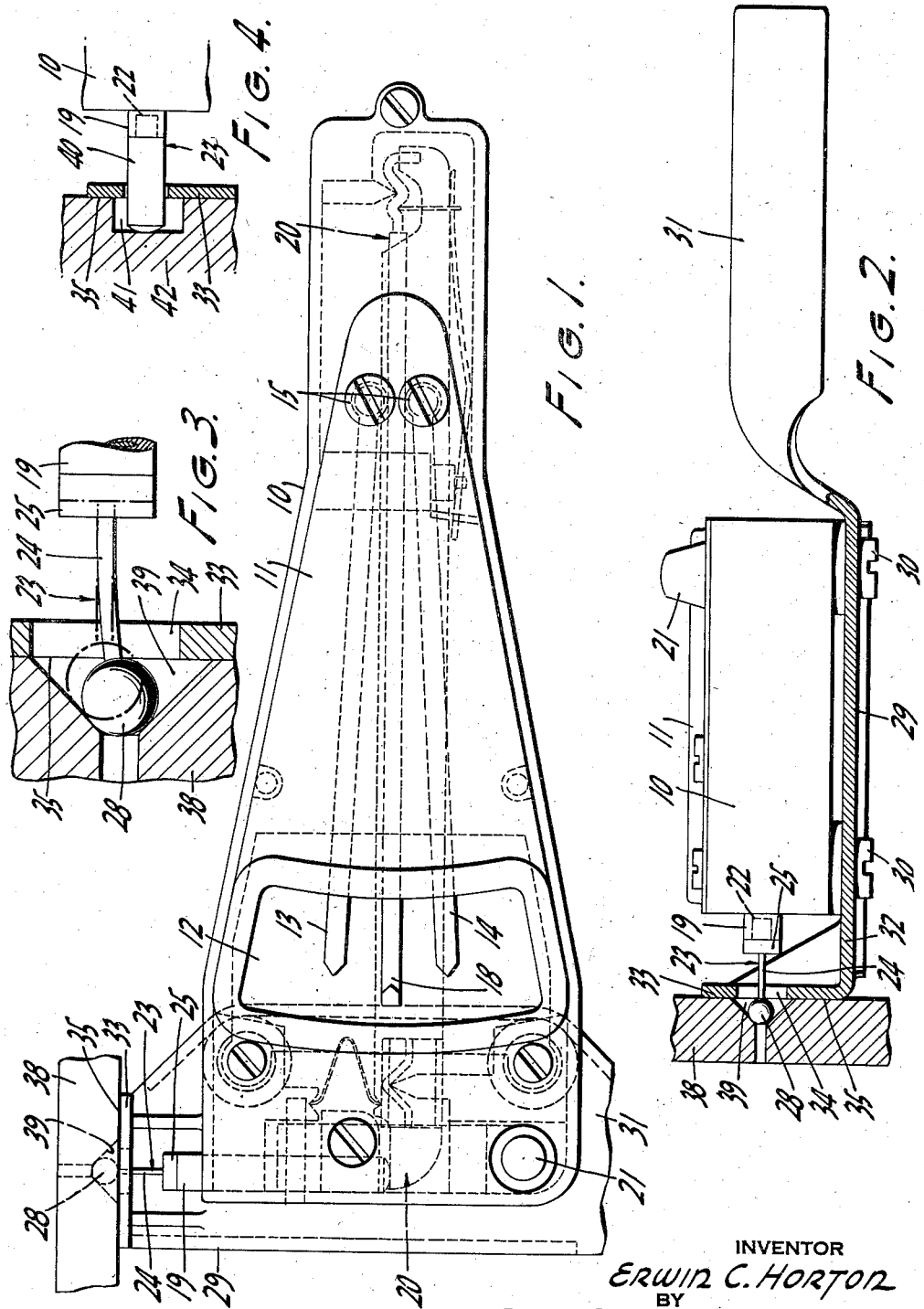

2,401,566

UNITED STATES PATENT OFFICE 2,401,566

GAUGE

Erwin C. Horton, Hamburg, N. Y., assignor to Trico Products Corporation, Buffalo, N. Y.

Application January 2, 1943, Serial No. 471,153

7 Claims. (Cl. 33—172)

This invention relates to gauges of the micrometer type for use in gauging the depth of countersinks, grooves, offsets and the like.

The object of the instant invention is to provide a gauging instrument of the class described which makes possible the rapid and extremely accurate inspection of countersinks and the like. It has for a further object to provide an instrument of this type which is of sturdy, practical and efficient construction and design but still easily handled by its operator. Other objects and advantages will become more apparent from the following detailed description of the invention as illustrated in the accompanying drawing, in which:

Fig. 1 is a plan view of the preferred embodiment of the invention shown in gauging relation with a workpiece;

Fig. 2 is an end elevational view as viewed from the left of Fig. 1, partly in section, and also in gauging position relative to a workpiece;

Fig. 3 is a detailed view of the work engaging part of the invention illustrating one of the particular advantages thereof; and Fig. 4 is a detailed view of a modified form of plunger tip illustrating another application of the invention.

Referring more particularly to the drawing, the numeral 10 designates a box like housing or casing for the gauging mechanism, and 11 indicates the removable cover thereof having a window 12 therein. Plus and minus tolerance indicators 13 and 14 are visible through the window and are herein depicted as elongated fingers mounted on the underside of the cover by friction held studs or rivets 15. Adjustments of these tolerance indicators to the various desired tolerances may be made by turning the studs 15 with any suitable instrument such as a screw driver. A pointer 18 operates in the window to indicate the dimensional characteristics of the workpiece, and this pointer is operatively connected to a work engaging plunger 19 by movement amplifying leverage generally shown as 20. The plunger is spring projected but normally held retracted by a device which is rendered inoperative upon depressing a release button 21 to perform the gauging operation, all of which is more fully described in Patent No. 2,362,203, granted November 7, 1944.

The plunger 19 is provided with a threaded end opening 22 for receiving variously shaped work engaging portions or tips 23. In this preferred exemplification of the invention as illustrated by Figs. 1, 2 and 3, the tip 23 comprises a flexible shank in the form of a spring rod 24 fastened to a stud 25 which is screw threaded into the opening 22, and a workpiece contacting ball 28 secured to the outer end thereof.

The housing 10 is mounted on a carrier 29 by means of the screws 30 and has a handle 31 extending from the right side of the housing adjacent the release button 21, as viewed in Fig. 2, by which the gauge may easily be held and operated with one hand thereby leaving the other hand free. The handle 31 is so placed in relation with the release button 21 that the operator may conveniently use the thumb or finger of the hand with which he is holding the gauge to press the button 21 to release the plunger for its gauging operation. The carrier 29 has a guard 32 extending from the left side of the housing 10, preferably opposite to said handle, and includes a rigidly braced vertical workpiece contacting portion or rest 33 spaced from the housing 10, having an opening 34 through which the tip 23 extends and a workpiece contacting face 35 of accurate plane form, although other forms or shapes may be used depending upon the surface of the workpiece. With this preferred construction the handle is in line with the plunger, and for the most part the plunger is visible to the operator whereby operational application of the instrument to the workpiece is greatly facilitated. The carrier, while being preferably as shown and described, may be formed in various other ways such as for example, the handle 31 and workpiece contacting portion 33 may be formed as integral parts of the housing 10.

In the illustrated embodiment the invention has been illustrated as by Figs. 1, 2, and 3, in gauging relation with a workpiece 38 having a drilled countersink 39. In its operation when it is desired to gauge the depth of the countersink 39 the operator places the face 35 flat against the workpiece so that the ball 28 registers with the countersink. The operator then depresses the button 21 releasing the plunger to allow the ball to seat itself in the countersink thereby operating the amplifying leverage 20 to actuate the pointer 18 which indicates the dimensional characteristics of the countersink.

A particular feature of the invention is illustrated more clearly by Fig. 3 wherein it will be observed that it is not necessary for the operator of the instrument to place it so that the ball 28 registers exactly with the center of the countersink. Should it be placed therein at an off center position, as illustrated by the broken line position, the flexible neck-forming wire or rod 24 will flex sufficiently for the ball to find the center as shown in full lines.

The invention has been found particularly useful in the aircraft industry where perfectly flush rivets are essential. By using this gauge the exact size rivet to be used in any given countersink can be found quickly and easily, thereby facilitating faster and better assembling procedures.

A modified form of the invention is illustrated in Fig. 4 wherein the flexible rod and ball tip has been replaced by a non-flexible tip 40 for the purpose of gauging the depth of a groove 41 in a workpiece 42. Thus it may be seen that by varying the tip or work contacting element various other gauging operations may thereby be made possible.

Although only the preferred embodiments of the invention have been shown and described, it will be apparent to those skilled in the art that the invention is not necessarily so limited but that various changes may be made therein without departing from the spirit and scope of the appended claims.

What is claimed is:

1. A depth gauge comprising a housing having therein means for indicating dimensional characteristics of workpieces, a plunger projecting from the housing for actuating said means, a carrier for said housing having a handle normally disposed on the side of the housing opposite the plunger and in line therewith and a workrest on the plunger side of the housing spaced outwardly therefrom and adapted to rest against a workpiece for accurately relating the gauge against the latter, said plunger having a tip mounted by a reduced flexible shank, which latter extends freely through an opening in said workrest for lateral deflection in engaging the workpiece when mutually placed thereagainst.

2. A countersink gauge comprising a housing, means in said housing for indicating dimensional characteristics of a countersink, flexible means releasably held inoperative for actuating said indicator means when released, means for releasing said flexible means, a carrier for said housing having a handle adjacent said releasing means and a work rest portion having an opening through which said flexible means projects for engagement with a countersink upon its release, said flexible means being adapted to find the center of the countersink by lateral deflection within the opening of the rest portion with the latter serving to limit such lateral deflection.

3. A depth gauge tool comprising an elongated body having a work rest at one end and a handle at the opposite end with an intermediate seat portion, micrometer gauging mechanism supported by the intermediate seat portion and having a work engaging plunger with means urging the latter to a work engaging position for gauging the work, the handle extending lengthwise of the body and in substantial alinement with but oppositely from the plunger, the work engaging face of the rest lying in a plane extending transversely of the longitudinal axis of the handle whereby the rest may be guidingly placed against the work from the handle, and means normally holding the plunger retracted and embodying a plunger release part disposed adjacent the handle to be actuated by a finger of the hand grasping the handle for the functioning of said urging means.

4. A portable hand tool for gauging a recess in a workpiece comprising a micrometer indicator having a work engaging plunger with spring means urging the latter against the workpiece, a handle extending from one side of the micrometer indicator in a direction opposite from the plunger, a workrest adjacent the plunger for supporting the tool against the workpiece for gauging operation, releasable spring means operable for holding said plunger normally retracted in counteraction of the first spring means, and manually operable means accessibe to a finger of the hand grasping the handle for releasing the second spring means to enable the first spring means projecting the plunger beyond the workrest for gauging operation.

5. A portable hand tool for gauging a recess in a workpiece comprising a micrometer indicator having a work engaging plunger, a handle extending from one side of the micrometer indicator in a direction opposite from the plunger, and a workrest carried by and spaced from the opposite side of the micrometer indicator, a ball tip flexibly connected to said plunger, said workrest having an opening through which said ball tip freely extends for movement laterally in finding the correct depth of the recess when displaced radially therefrom.

6. A gauge having a micrometer indicating means and a connected plunger, a work engaging tip, and a laterally flexible spring shank mounting the tip on the plunger, the opposite ends of the spring shank being fixed in the tip and the plunger respectively and providing a flexible neck to enable lateral deflection of the tip with respect to the plunger.

7. A gauge having a casing, a micrometer indicating means therein and including a connected plunger projecting from the casing, a work engaging tip, a relatively reduced spring connector mounting the tip on the plunger and providing a flexible neck to enable off-center displacement of the tip with respect to the longitudinal axis of the plunger during axial movement of the plunger with the tip and the connector as a unit, and a guard part rigid with the casing and having an opening through and beyond which the tip projects.

ERWIN C. HORTON.